United States Patent
Okazaki et al.

(10) Patent No.: US 7,691,555 B2
(45) Date of Patent: Apr. 6, 2010

(54) PHOTOCURABLE COMPOSITION AND COATING COMPOSITION

(75) Inventors: Hitoshi Okazaki, Tokyo (JP); Junya Hayakawa, Tokyo (JP); Motoharu Takeuchi, Tokyo (JP); Masahiro Johno, Tokyo (JP); Kenji Ishii, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/563,868

(22) PCT Filed: Aug. 4, 2004

(86) PCT No.: PCT/JP2004/011520

§ 371 (c)(1),
(2), (4) Date: Jan. 9, 2006

(87) PCT Pub. No.: WO2005/014696

PCT Pub. Date: Feb. 17, 2005

(65) Prior Publication Data

US 2007/0066702 A1    Mar. 22, 2007

(30) Foreign Application Priority Data

Aug. 6, 2003 (JP) ............................. 2003-288288
Feb. 5, 2004 (JP) ............................. 2004-029979

(51) Int. Cl.
G03F 7/004 (2006.01)
G03F 7/028 (2006.01)

(52) U.S. Cl. .................................. 430/270.1; 430/920

(58) Field of Classification Search .............. 430/270.1, 430/286.1, 287.1, 309, 913, 914, 919, 920
See application file for complete search history.

(56) References Cited

U.S. PATENT DOCUMENTS

| 3,624,055 | A | * | 11/1971 | Gobran et al. ............... 528/392 |
| 4,975,922 | A | * | 12/1990 | Sakane et al. ............ 372/49.01 |
| 5,807,975 | A | * | 9/1998 | Amagai et al. ............... 528/373 |
| 5,945,504 | A | * | 8/1999 | Amagi et al. ................ 528/373 |
| 2002/0179241 | A1 | * | 12/2002 | Haniu et al. ............. 156/308.6 |
| 2003/0022956 | A1 | | 1/2003 | Wanigatunga et al. |
| 2003/0129385 | A1 | * | 7/2003 | Hojo et al. .................. 428/323 |
| 2003/0195270 | A1 | * | 10/2003 | Ishii et al. ...................... 522/71 |

FOREIGN PATENT DOCUMENTS

| EP | 0761665 | 3/1997 |
| JP | 09-071580 | 3/1997 |
| JP | 09-110979 | 4/1997 |
| JP | 09-255781 | 9/1997 |
| JP | 11-071521 | 3/1999 |
| JP | 2002-047346 | 2/2002 |
| JP | 2002-105110 | 4/2002 |
| JP | 2003-026806 | 1/2003 |
| JP | 2003-261648 | 9/2003 |
| WO | WO 98/38195 | 9/1998 |
| WO | WO 01/57113 | 8/2001 |
| WO | WO 02/088220 | 11/2002 |

OTHER PUBLICATIONS

Hideki Tachi, Takayuki Yamamoto, Masamitsu Shirai, Masahiro Tsunooka—Photochemical Reactions of Quaternary Ammonium Dithiocarbamates as Photobase Generators and Their Use in The Photoinitiated Thermal Crosslinking of Poly(gycidylmethacrylate), Journal of Polymer Science, Part A: Polymer Chemistry, vol. 39, pp. 1329-1341 (2001).*
Journal of Photopolymer Science and Technology vol. 16, No. 1 (2003) pp. 83-86.
Journal of Photopolymer Science and Technology vol. 15, No. 1 (2002) pp. 47-50.

* cited by examiner

*Primary Examiner*—Cynthia H Kelly
*Assistant Examiner*—Anca Eoff
(74) *Attorney, Agent, or Firm*—Antonelli, Terry, Stout & Kraus, LLP.

(57) ABSTRACT

There are provided a photocurable composition capable of being readily cured by irradiation of ultraviolet rays and a cured product of the photocurable composition, as well as a coating composition and a coating film obtained from the coating composition. The cured product exhibits a high refractive index, a less discoloration and an excellent transparency. The present invention relates to a photocurable composition comprising (A) an episulfide compound containing a thiirane ring; and (B) a photo-base generator represented by the general formula (1):

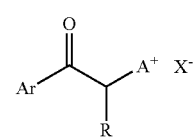

(1)

wherein Ar is phenyl, etc.; R is an alkyl group, etc.; $-A^+$ is an ammonium ion; and $X^-$ is a borate anion, etc., and a coating composition comprising the photocurable composition and (C) a modified silicone oil, as well as a cured product and a coating film obtained from these compositions.

15 Claims, No Drawings

PHOTOCURABLE COMPOSITION AND COATING COMPOSITION

TECHNICAL FIELD

The present invention relates to photocurable compositions and coating compositions useful for producing optical products such as optical adhesives, optical coating materials, potting agents for LED, photofunctional films, photofunctional substrates, resist materials, prisms, optical fibers, filters and plastic lenses.

BACKGROUND ART

Plastic materials have been recently used as various optical materials because of light weight, high tenacity and easy-dyeability thereof. One of properties required for many optical materials is a high refractive index. As high refractive optical materials, there have been found a large number of episulfide compounds capable of providing optical materials having a refractive index of 1.7 or more (refer to JP 9-71580A, JP 9-110979A and JP 9-255781A). Most of these conventionally known episulfide compounds are heat-curing compounds and, therefore, extremely low in productivity and used only in limited applications. For this reason, it has been strongly demanded to provide photocurable materials which can be produced with a high productivity.

The methods for photocuring episulfide compounds are disclosed in WO 01/57113, JP 2002-047346A, JP 2002-105110, US 2003-0022956A and JP 2003-026806A. In these published patent documents, as initiators, there are disclosed radical generators, acid generators, base generators, etc. Since base catalysts exhibit a highest activity to polymerization of the episulfide compounds, it is considered that among these initiators, the base generators are most preferably used for photocuring the episulfide compounds. However, since studies on the photo-base generators are still short in history, base generators capable of exhibiting a practically usable activity have not been found until now. The photo-based generators are disclosed in "Chemical Industry", Vol. 50, pp. 592 to 600 (1999), "J. Polym. Sci. Part A", Vol. 39, pp. 1329 to 1341 (2001), etc.

Conventionally, the episulfide compounds are cast into a so-called mold and then polymerized and cured therein to obtain a cured product thereof. Owing to the remarkably high refractive index of these episulfide compounds, there is a strong demand for applying the episulfide compounds to coating materials for various substrates or films. However, since coating materials made of the episulfide compounds generally exhibit a poor wetting property to various substrates, it is difficult to stably form a thin film having a thickness of from several μm to several tens μm.

An object of the present invention is to provide photocurable compositions containing an episulfide compound capable of being readily cured by irradiation of ultraviolet rays and a high-refractive cured product obtained by irradiation of ultraviolet rays, as well as a coating material containing an episulfide compound capable of being readily cured by irradiation of ultraviolet rays and a high-refractive coating film obtained by irradiation of ultraviolet rays.

DISCLOSURE OF THE INVENTION

As a result of extensive studies to solve the above problems, the inventors have found that a photocurable composition comprising (A) an episulfide compound containing a thiirane ring; and (B) a photo-base generator represented by the general formula (1):

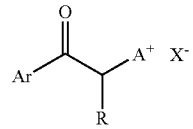

wherein Ar is phenyl, biphenyl, naphthyl, phenathryl, anthracyl, pyrenyl, 5,6,7.8-tetrahydro-2-naphthyl, 5,6,7,8-tetrahydro-1-naphthyl, thienyl, benzo [b]thienyl, naphtho[2,3-b] thienyl, thianthrenyl, dibenzofuryl, chromenyl, xanthenyl, thioxanthyl, phenoxanthinyl, terphenyl, stilbenyl or fluorenyl which may be unsubstituted, or mono- or poly-substituted with an alkyl group having 1 to 18 carbon atoms, an alkenyl group having 3 to 18 carbon atoms, an alkynyl group having 3 to 18 carbon atoms, a haloalkyl group having 1 to 18 carbon atoms, $NO_2$, OH, CN, $OR^1$, $SR^2$, $C(O)R^3$, $C(O)OR^4$ or halogen wherein R, $R^1$, $R^2$, $R^3$ and $R^4$ are respectively hydrogen or an alkyl group having 1 to 18 carbon atoms; —$A^+$ is an ammonium ion selected from the group consisting of those represented by the structural formulae (2):

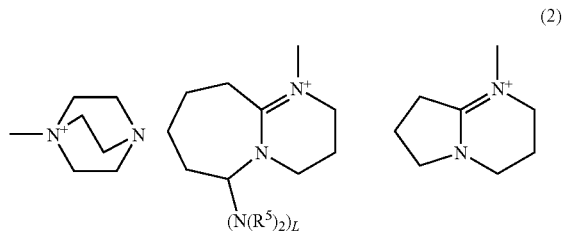

wherein L is 1 or 0; and $R^5$ is an alkyl group having 1 to 5 carbon atoms; and $X^-$ is a borate anion, an N,N-dimethyldithiocarbamate anion, an N,N-dimethylcarbamate anion, a thiocyanate anion or a cyanate anion, can be readily cured by irradiation of ultraviolet rays to produce the aimed cured product. The first aspect of the present invention has been accomplished on the basis of this finding.

In addition, when the thiirane ring-containing compound is a compound having at least one structure represented by the structural formula (3):

the resultant photocurable composition is more suitable as a photocurable composition since a cured product obtained from the composition can exhibit a higher refractive index.

Further, it has been found that a composition obtained by adding a modified silicone oil to the above photocurable composition is suitable as a coating composition since the composition shows a good wetting property to various substrates. The second aspect of the present invention has been accomplished on the basis of the finding.

PREFERRED EMBODIMENTS FOR CARRYING OUT THE INVENTION

First Aspect of the Invention

The photo-base generator (B) used in the present invention which is represented by the general formula (1) is capable of generating 1,4-diazabicyclo[2.2.2]octane, 1,8-diazabicyclo[5.4.0]-7-undecene derivatives and 1,5-diazabicyclo[4.3.0]-5-nonene which have a strong basicity upon irradiation of ultraviolet rays and, therefore, can exhibit an extremely high activity to polymerization of episulfide compounds.

In the general formula (1), Ar is phenyl, biphenyl, naphthyl, phenathryl, anthracyl, pyrenyl, 5,6,7.8-tetrahydro-2-naphthyl, 5,6,7.8-tetrahydro-1-naphthyl, thienyl, benzo[b]thienyl, naphtho[2,3-b]thienyl, thianthrenyl, dibenzofuryl, chromenyl, xanthenyl, thioxanthyl, phenoxanthinyl, terphenyl, stilbenyl or fluorenyl. These groups may be unsubstituted or mono- or poly-substituted with an alkyl group having 1 to 18 carbon atoms, an alkenyl group having 3 to 18 carbon atoms, an alkynyl group having 3 to 18 carbon atoms, a haloalkyl group having 1 to 18 carbon atoms, $NO_2$, OH, CN, $OR^1$, $SR^2$, $C(O)R^3$, $C(O)OR^4$ or halogen wherein R, $R^1$, $R^2$, $R^3$ and $R^4$ are respectively hydrogen or an alkyl group having 1 to 18 carbon atoms. Of these groups as Ar, preferred is an unsubstituted phenyl, biphenyl or naphthyl group.

R is hydrogen or an alkyl groups having 1 to 18 carbon atoms. Of these groups as R, preferred is hydrogen.

—$A^+$ is an ammonium ion selected from the group consisting of those represented by the structural formulae (2):

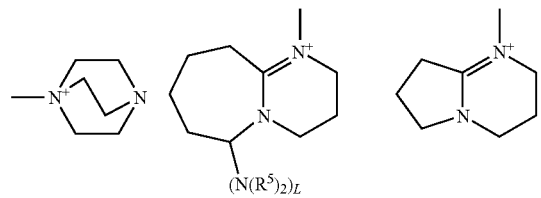

(2)

wherein L is 1 or 0; and $R^5$ is an alkyl group having 1 to 5 carbon atoms.

When the 1,8-diazabicyclo[5.4.0]-7-undecene derivatives are to be generated as a base from the photo-base generator, —$A^+$ is preferably unsubstituted (i.e., L=0).

$X^-$ represents a counter anion, and is a borate anion, an N,N-dimethyldithiocarbamate anion, an N,N-dimethylcarbamate anion, a thiocyanate anion or a cyanate anion. Of these anions, preferred is a borate anion. Examples of the borate anion include anions derived from tetraphenyl borate, methyltriphenyl borate, ethyltriphenyl borate, propyltriphenyl borate, butyltriphenyl borate, pentyltriphenyl borate and hexyltributyl.

Specific examples of the photo-base generator represented by the general formula (1) which is suitably used in the present invention include compounds shown in the following Tables I-1 to I-4 wherein Ph represents a phenyl group, and Bu represents an n-butyl group. Of these compounds, more preferred are the compounds Nos. 1 to 18.

TABLE I-1

Ar—CO—CH(R)—$A^+X^-$

| No. | Ar | R | $A^+$ | $X^-$ |
|---|---|---|---|---|
| 1 | phenyl | H | DABCO-type | $B^-(Ph)_4$ |
| 2 | biphenyl | H | DABCO-type | $B^-(Ph)_4$ |
| 3 | naphthyl | H | DABCO-type | $B^-(Ph)_4$ |
| 4 | phenyl | H | DABCO-type | $B^-Bu(Ph)_3$ |
| 5 | biphenyl | H | DABCO-type | $B^-Bu(Ph)_3$ |
| 6 | naphthyl | H | DABCO-type | $B^-Bu(Ph)_3$ |
| 7 | phenyl | H | DBU-type | $B^-(Ph)_4$ |
| 8 | biphenyl | H | DBU-type | $B^-(Ph)_4$ |
| 9 | naphthyl | H | DBU-type | $B^-(Ph)_4$ |

TABLE I-2

Ar—CO—CH(R)—$A^+X^-$

| No. | Ar | R | $A^+$ | $X^-$ |
|---|---|---|---|---|
| 10 | phenyl | H | DBU-type | $B^-Bu(Ph)_3$ |
| 11 | biphenyl | H | DBU-type | $B^-Bu(Ph)_3$ |

TABLE I-2-continued
| No. | Ar | R | A⁺ | X⁻ |
|---|---|---|---|---|
| 12 | 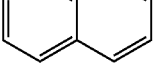 | H | 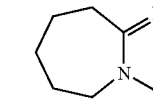 | B⁻Bu(Ph)3 |
| 13 |  | H | 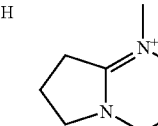 | B⁻(Ph)4 |
| 14 | 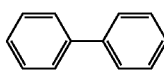 | H | 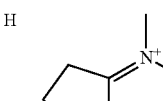 | B⁻(Ph)4 |
| 15 | 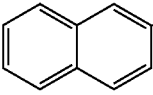 | H | 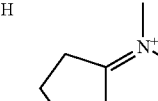 | B⁻(Ph)4 |
| 17 | 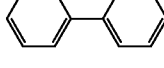 | H | 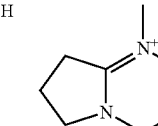 | B⁻Bu(Ph)3 |
| 18 | 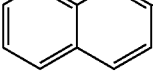 | H | 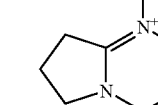 | B⁻Bu(Ph)3 |
| 19 | 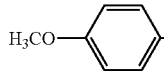 | H | 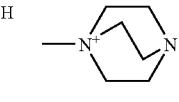 | B⁻(Ph)4 |
| 20 | 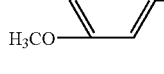 | H | 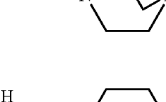 | B⁻(Ph)4 |
| 21 | 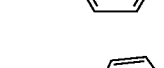 | H | 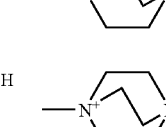 | B⁻(Ph)4 |
| 22 | 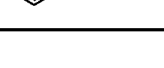 | H | 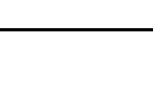 | B⁻(Ph)4 |
TABLE I-3
| No. | Ar | R | A⁺ | X⁻ |
|---|---|---|---|---|
| 23 |  | H | 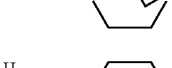 | B⁻Bu(Ph)3 |
| 24 |  | H | 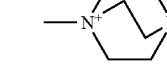 | B⁻Bu(Ph)3 |
| 25 | 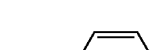 | H |  | B⁻Bu(Ph)3 |
| 26 | 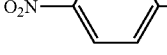 | H | 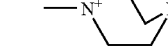 | B⁻Bu(Ph)3 |
| 27 | 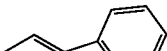 | H | 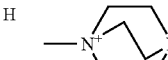 | B⁻(Ph)4 |
| 28 | 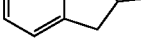 | H |  | B⁻(Ph)4 |
| 29 | 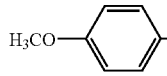 | H | 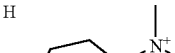 | B⁻(Ph)4 |
| 30 |  | H |  | B⁻(Ph)4 |
| 31 | 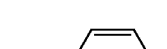 | H |  | B⁻Bu(Ph)3 |
| 32 |  | H | 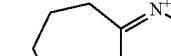 | B⁻Bu(Ph)3 |
| 33 |  | H | 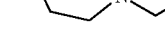 | B⁻Bu(Ph)3 |

TABLE I-3-continued

Ar—CO—CH(R)—A⁺X⁻

| No. | Ar | R | A⁺ | X⁻ |
|---|---|---|---|---|
| 34 | (2-methylfluorenyl) | H | (DBU-methyl cation) | B⁻Bu(Ph)3 |

TABLE I-4

Ar—CO—CH(R)—A⁺X⁻

| No. | Ar | R | A⁺ | X⁻ |
|---|---|---|---|---|
| 35 | 4-H₃CO-C₆H₄- | H | (DBU-methyl) | B⁻(Ph)4 |
| 36 | 3-H₃CO-C₆H₄- | H | (DBU-methyl) | B⁻(Ph)4 |
| 37 | 4-O₂N-C₆H₄- | H | (DBU-methyl) | B⁻(Ph)4 |
| 38 | (2-methylfluorenyl) | H | (DBU-methyl) | B⁻(Ph)4 |
| 39 | 4-H₃CO-C₆H₄- | H | (DBU-methyl) | B⁻Bu(Ph)3 |
| 40 | 3-H₃CO-C₆H₄- | H | (DBU-methyl) | B⁻Bu(Ph)3 |
| 41 | 4-O₂N-C₆H₄- | H | (DBU-methyl) | B⁻Bu(Ph)3 |
| 42 | (2-methylfluorenyl) | H | (DBU-methyl) | B⁻Bu(Ph)3 |

The photo-base generator (B) is used in an amount of from 0.001 to 20 parts by weight, preferably from 0.005 to 10 parts by weight and more preferably from 0.01 to 5 parts by weight based on 100 parts by weight of the thiirane ring-containing compound (A).

The thiirane ring-containing compound (A) used in the present invention is subjected to ring opening polymerization to produce a cured product thereof. The thiirane ring-containing compound is such an organic compound containing one or more thiirane rings in a molecule thereof. In view of a high refractive index of the obtained cured product, the thiirane ring-containing compound is preferably a compound having at least one structure represented by the following structural formula (3):

(3)

Further, in view of a good surface hardness of the cured product, the thiirane ring-containing compound is more preferably a compound having two or more structures represented by the structural formula (3), and in view of obtaining a liquid composition having an easy-handling property and an adequate viscosity, the thiirane ring-containing compound is still more preferably a chain-like compound having two or more structures represented by the structural formula (3). When the above requirements are totally taken into consideration, the thiirane ring-containing compound is most preferably a compound represented by the following structural formula (4):

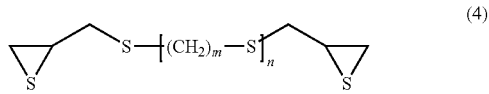

(4)

wherein m is an integer of 0 to 4; and n is an integer of 0 to 2.

Specific examples of the thiirane ring-containing compound (A) used in the present invention include ethylene sulfide, propylene sulfide, cyclohexene sulfide, styrene sulfide, thioglycidol, 1,1-bis(epithioethyl)methane, tetrakis(β-epithiopropyl)methane, 1,1,1-tris(β-epithiopropyl)propane, (1,3- or 1,4-)-bis(epithioethyl)cyclohexane, 2,5-bis(epithioethyl)-1,4-dithiane, 4-epithioethyl-1,2-cyclohexene sulfide, 4-epoxy-1,2-cyclohexene sulfide, methylthioglycidyl ether, bis(β-epithiopropyl)ether, 1,2-bis(β-epithiopropyloxy)ethane, tetrakis(β-epithiopropyloxymethyl)methane, 1,1,1-tris (β-epithiopropyloxymethyl)propane, bis[4-(β-epithiopropyloxy)cyclohexyl]methane, 2,2-bis[4-(β-epithiopropyloxy)cyclohexyl]propane, bis[4-(β-epithiopropyloxy)cyclohexyl]sulfide, 2,5-bis(β-epithiopropyloxymethyl)-1,4-dithiane, (1,3- or 1,4-)-bis(β-epithiopropyloxy)benzene, (1,3- or 1,4-)-bis(β-epithiopropyloxymethyl)benzene, bis[4-(β-epithiopropyloxy)phenyl]methane, 2,2-bis[4-(β-epithiopropyloxy)phenyl]propane, bis[4-(β-epithiopropyloxy)phenyl]sulfide, bis[4-(β-epithiopropyloxy)phenyl]sulfone, 4,4'-bis(β-epithiopropyloxy)biphenyl, bis(β-epithiopropyl)sulfide, bis (β-epithiopropyl)disulfide, bis(β-epithiopropyl)trisulfide, bis (β-epithiopropylthio)methane, 1,2-bis(β-epithiopropylthio) ethane, 1,3-bis(β-epithiopropylthio)propane, 1,2-bis(β- epithiopropylthio)propane, 1,4-bis(β-epithiopropylthio)butane, 1,5-bis(β-epithiopropylthio)pentane, 1,6-bis(β-epithiopropylthio)hexane, bis(β-epithiopropylthioethyl)sulfide, tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropyl thioethyl)thiomethyl]-3,7-dithianonane, 1,10-bis(β-epithiopropylthio)-5,6-bis[(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane, 1,11-bis(β-epithiopropylthio)-4,7-bis(β-epithiopropylthiomethyl)-3,6,9-trithiaundecane, 2,5-bis(epithiopropylthiomethyl)-1,4-dithiane, 2,4,6-tris(epithiopropylthiomethyl)-1,3,5-dithiane, (1,3- or 1,4-)-bis(β-epithiopropylthio)benzene, (1,3- or 1,4-)-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone, 4,4'-bis(β-epithiopropylthio)biphenyl, bis(β-epithiopropyl)selenide, bis(β-epithiopropyl)diselenide, bis(β-epithiopropyl)telluride, bis(β-epithiopropyl)ditelluride, vinylphenylthioglycidyl ether, vinylbenzylthioglycidyl ether, thioglycidyl methacrylate, thioglycidyl acrylate and allylthioglycidyl ether, as well as thiirane ring-containing compounds obtained by replacing one or more hydrogen atoms bonded to a thiirane ring of the above exemplified compounds with methyl groups.

Among these thiirane ring-containing compounds (A), more preferred are bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,4-bis(β-epithiopropylthio)butane, 1,5-bis(β-epithiopropylthio)pentane, 1,6-bis(β-epithiopropylthio)hexane and bis(β-epithiopropylthioethyl) sulfide.

Of these more preferred thiirane ring-containing compounds (A), still more preferred are bis(β-epithiopropyl)sulfide and bis(β-epithiopropyl)disulfide.

In the present invention, the photocurable composition may further contain, if required, a thiol group-containing compound to form a cured product exhibiting a less discoloration and an excellent transparency. The thiol group-containing compound means such an organic compound containing one or more thiol groups in a molecule thereof In view of enhancing a hardness of the resultant cured product, the use of such a compound having two or more thiol groups is preferred.

Specific examples of the thiol group-containing compound include methane dithiol, methane trithiol, 1,2-dimercaptoethane, bis(2-mercaptoethyl)sulfide, bis(2,3-dimercaptopropyl)sulfide, 1,2,3-trimercaptopropane, 2-mercaptomethyl-1,3-dimercaptopropane, 4-mercaptomethyl-1,8-dimercapto-3,6-dithiaoctane, 2,4-bis(mercaptomethyl)-1,5-dimercapto-3-thiapentane, 4,8-bis(mercaptomethyl)-1,11-dimercapto-3,6,9-trithiaundecane, 4,7-bis(mercaptomethyl)-1,11-dimercapto-3,6,9-trithiaundecane, 5,7-bis(mercaptomethyl)-1,11-dimercapto-3,6,9-trithiaundecane, 1,2,7-trimercapto-4,6-dithiaheptane, 1,2,9-trimercapto-4,6,8-trithianonane, 1,2,8,9-tetramercapto-4,6-dithianonane, 1,2,10,11-tetramercapto-4,6,8-trithiaundecane, 1,2,12,13-tetramercapto-4,6,8,10-tetrathiatridecane, tetrakis(mercaptomethyl)methane, tetrakis(4-mercapto-2-thiabutyl)methane, tetrakis(7-mercapto-2,5-dithiaheptyl)methane, trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 2,5-bis(mercaptomethyl)-1,4-dithiane, bis(4-mercaptophenyl)sulfide, bis(4-mercaptomethylphenyl)methane, 2,2-bis(4-mercaptomethylphenyl)propane, bis(4-mercaptomethylphenyl)ether and bis(4-mercaptomethylphenyl)sulfide.

The preferred thiol group-containing compounds illustrated above may be used alone or in the form of a mixture of any two or more thereof. The amount of the thiol group-containing compound added is preferably from 0.1 to 100 parts by weight and more preferably from 1 to 50 parts by weight based on 100 parts by weight of the thiirane ring-containing compound (A).

Further, for the purpose of improving various properties of the resultant cured product such as a weather resistance, an oxidation resistance, a strength, a surface hardness, an adhesion property, a refractive index and a dyeability, a compound which is reactive with a part or whole of components of the composition may be further added thereto. Examples of the compound reactive with a part or whole of components of the composition include epoxy compounds, iso(thio)cyanates, carboxylic acids, carboxylic anhydrides, phenols, amines, vinyl compounds, allyl compounds, acrylic compounds and methacrylic compounds. The amount of the compound added which is reactive with a part or whole of components of the composition is 1 to 200 parts by weight based on 100 parts by weight of the thiirane ring-containing compound (A).

Some of the photo-base generators (B) represented by the general formula (1) may exhibit a poor solubility in the thiirane ring-containing compound (A). In such a case, there may be used a solvent capable of dissolving the photo-base generator therein. The solvent is not particularly limited as long as it is capable of dissolving the photo-base generator therein. The solvent preferably has a high dissolving power to the photo-base generator and does not disturb the polymerization reaction of the thiirane ring-containing compound. Specific examples of the solvent include lactones such as γ-butyrolactone, ethers such as tetrahydrofuran and diethyl ether, amides such as N,N-dimethylformamide, aromatic hydrocarbons such as toluene, aliphatic hydrocarbons such as hexane, ketones such as acetone and methyl ethyl ketone, esters such as ethyl acetate, alcohols such as isopropyl alcohol, and halogenated alkyl compounds such as dichloromethane. The amount of the solvent used is preferably 0.1 to 30 parts by weight, more preferably 1 to 20 parts by weight and most preferably 1 to 10 parts by weight based on 100 parts by weight of the thiurane ring-containing compound (A).

The photocurable composition of the present invention may further contain a sensitizer. Specific examples of the sensitizer include benzophenone, acetophenone, thioxanthone, anthracene, perylene and phenothiazine. The sensitizer used in the present invention is not limited to the above exemplified compounds, and any suitable compounds may be used as the sensitizer as long as they can accelerate the polymerization curing effect in response to irradiation of ultraviolet rays. The amount of the sensitizer used is 0.001 to 20 parts by weight, preferably 0.005 to 10 parts by weight and more preferably 0.01 to 5 parts by weight based on 100 parts by weight of the thiirane ring-containing compound (A).

The photocurable composition of the present invention may also contain various additives, e.g., antioxidants such as phenol-based compounds and phosphite-based compounds, bluing agents such as oil-soluble dyes, typically anthraquinone-based compounds, ultraviolet absorbers such as benzophenone-based compounds and benzotriazole-based compounds, thixotropic agents and antistatic agents to enhance utility of the resultant cured product.

The ultraviolet light source used in the present invention upon curing the photocurable composition by irradiation of ultraviolet rays, is not particularly limited as long as the light source is an apparatus capable of generating ultraviolet rays. Specific examples of the ultraviolet light source include a high pressure mercury lamp, an extra-high pressure mercury lamp, a metal halide lamp and a high-power metal halide lamp.

The amount of ultraviolet rays irradiated varies depending upon amount of the photo-base generator added, amount of curing catalyst used, etc., and is usually 1 to 100 mW/cm$^2$ and preferably 10 to 50 mW/cm$^2$, and the irradiation time is from 1 s to 1 h and preferably from 10 s to 10 min.

The photocurable composition irradiated with ultraviolet rays may be then subjected to further heat treatment to accelerate curing of the composition. The heat-treating temperature and time may be appropriately determined depending upon polymerization degree of the composition after irradiation of ultraviolet rays. The heat-treating temperature is usually 40 to 200° C. and preferably 60 to 120° C., and the heat-treating time is from 1 min to 3 days and preferably from 1 min to 12 h.

Upon curing by irradiation of ultraviolet rays, when the photocurable composition of the present invention is directly contacted with atmospheric air, curing thereof is prevented from proceeding due to the disturbance effect of oxygen. Therefore, it is required that the curing reaction of the photocurable composition is conducted in the absence of air. As the method of preventing the curing reaction system from contacting with air, there may be used the method of covering the photocurable composition with a transparent film, the method of casting the photocurable composition into a sealable mold, or the method of controlling an ambient atmosphere of the photocurable composition to an inert gas atmosphere. In the case where the curing of the photocurable composition is conducted in the inert gas atmosphere, an oxygen concentration in the atmosphere is preferably 3% or lower, more preferably 0.5% or lower and most preferably 0.3% or lower.

The photocurable composition is preferably previously subjected to deaeration and filtration treatments before polymerization and curing thereof to obtain a cured product having a high transparency. The deaeration treatment may be usually conducted under a reduced pressure of 0.001 50 Torr at a temperature of 0 to 100° C. for a period of from 1 min to 24 h, whereas the filtration treatment may be conducted by passing through a filter made of PTFE or PET having a pore diameter of about 0.05 to 10 μm.

Second Aspect of the Invention

A coating composition having a good wetting property can be produced by adding (C) a modified silicone oil and/or (D) a silane coupling agent to the photocurable composition according to the first aspect of the present invention. Further, a coating film obtained by curing the coating composition exhibits a high refractive index and a less discoloration, and is excellent in transparency, uniformity and adhesion property. When the thickness of the coating film is too small, the coating film tends to be insufficient in the effects of protecting the substrate, and exhibiting the aimed properties. When the thickness of the coating film is too large, the optical products with the coating film tends to suffer from increase in size and weight. Practically, the thickness of the coating film is about 0.1 to 1000 μm, preferably about 0.5 to 500 μm and more preferably about 1 to 100 μm.

The modified silicone oil (C) used in the present invention is represented by the following structural formulae (5) to (8), and the addition of the modified silicone oil (C) allows the coating composition to be improved in wetting property and used as a suitable coating material.

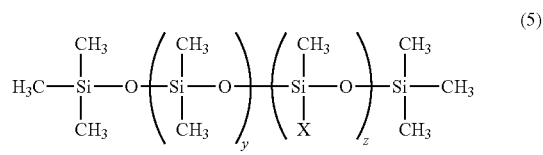

(5)

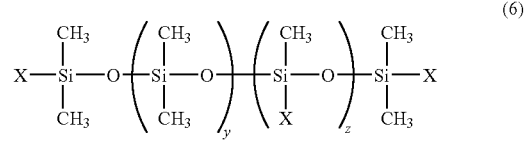

(6)

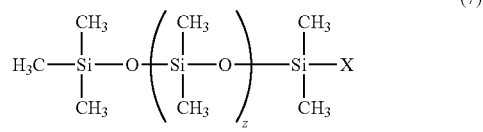

(7)

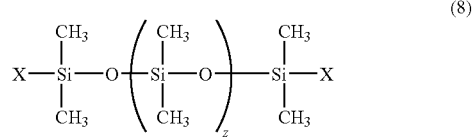

(8)

wherein X is each independently halogen, an alkoxy group having 1 to 36 carbon atoms, an alkyl group having 1 to 36 carbon atoms, an aliphatic acid ester group having 1 to 36 carbon atoms, a polyether group which may contain a hydrocarbon having 1 to 36 carbon atoms in total, etc.; and y and z are each independently an integer of 1 or more.

In view of the positional structure, the modified silicone oils (C) are generally classified into a side chain-modified type represented by the above structural formula (5), a side chain/both terminal end-modified type represented by the above structural formula (6), one terminal end-modified type represented by the above structural formula (7) and a both terminal end-modified type represented by the above structural formula (8). Also, in view of the chemical structure, the modified silicone oils (C) are generally classified into reactive types such as an amino-modified type, an epoxy-modified type, a carboxyl-modified type, a carbinol-modified type, a (meth)acryloyl-modified type, a mercapto-modified type, a phenol-modified type and a different functional groups-modified type, and non-reactive types such as a polyether-modified type, a methylstyryl-modified type, an alkyl-modified type, a higher fatty ester-modified type, a hydrophilic special modified type, a higher alkoxy-modified type, a fluorine-modified type and a higher fatty acid-modified type.

In the present invention, among the above positional structure-classified modified silicone oils, preferred are the side chain-modified type silicone oils represented by the structural formula (5) and the both terminal end-modified type silicone oils represented by the structural formula (8), whereas among the above chemical structure-classified modified silicone oils, preferred are the silicone oils of a mercapto-modified type, a polyether-modified type and an epoxy-modified type, and more preferred are the silicone oils of a polyether-modified type having a good surface activating performance.

Specific examples of the preferred modified silicone oils include commercial products available from Shin-Etsu Chemical Co., Ltd., under tradenames "KF-101", "KF-102", "KF-105", "KF-351", "KF-352", "KF-618", "KF-945", "KF-2001", "KF-2004", "X-22-163A", "X-22-163B", "X-22-167B", "X-22-169A", "X-22-2000" and "X-22-4741", and commercial products available from BYK Chemie Japan Co., Ltd., under tradenames "BYK-307", "BYK-325" and "BYK-333".

The modified silicone oils (C) may be used alone or in the form of a mixture of any two or more thereof. The amount of the modified silicone oil (C) added is 0.005 to 4.0 parts by weight, preferably 0.005 to 3.0 parts by weight and more preferably 0.1 to 2.0 parts by weight based on 100 parts by weight of the thiirane ring-containing compound. When the amount of the modified silicone oil (C) added is less than 0.005 part by weight, the obtained coating composition tends to be insufficient in wetting property. When the amount of the modified silicone oil (C) added is more than 4 parts by weight, the coating film obtained from the coating composition tends to be deteriorated in transparency.

In the present invention, the coating composition may further contain (D) a silane coupling agent represented by the following structural formula (9), if required, to form a coating film having excellent uniformity and adhesion property:

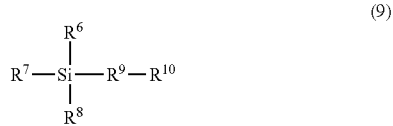

(9)

wherein $R^6$, $R^7$ and $R^8$ are each independently halogen, an alkoxy group having 1 to 4 carbon atoms or an alkyl group having 1 to 4 carbon atoms; $R^9$ is a single bond or an alkylene bond having 1 to 4 carbon atoms which may contain an alkyl side chain having 1 to 4 carbon atoms; and $R^{10}$ is a reactive group which may contain an alkyl side chain having 1 to 4 carbon atoms, such as a vinyl group; a styryl group; a (meth) acryloyl group; an epoxy-containing group such as a glycidyl group; an amino-containing group such as an amino group, an aminoethylamino group and a phenylamino group; a mercapto group; an isocyanate group; a halogen group; and an ureido group.

Specific examples of the silane coupling agent (D) include vinyl trichlorosilane, vinyl trimethoxysilane, vinyl triethoxysilane, 4-styryl trimethoxysilane, γ-acryloxypropyl trimethoxysilane, γ-methacryloxypropyl trimethoxysilane, γ-methacryloxypropyl triethoxysilane, γ-methacryloxypropylmethyl dimethoxysilane, γ-methacryloxypropylmethyl diethoxysilane, γ-glycidoxypropyl trimethoxysilane, γ-glycidoxypropyl triethoxysilane, γ-glycidoxypropylmethyl dimethoxysilane, γ-glycidoxypropylmethyl diethoxysilane, β-(3,4-epoxycyclohexyl)ethyl trimethoxysilane, γ-(3,4-epoxycyclohexyl)propyl trimethoxysilane, γ-aminopropyl trimethoxysilane, γ-aminopropyl triethoxysilane, N-aminoethyl-γ-aminopropyl trimethoxysilane, N-aminoethyl-γ-aminopropyl triethoxysilane, N-aminoethyl-γ-aminopropylmethyl dimethoxysilane, N-aminoethyl-γ-aminopropylmethyl diethoxysilane, N-phenyl-γ-aminopropyl trimethoxysilane, γ-mercaptopropyl trimethoxysilane, γ-mercaptopropyl triethoxysilane, γ-mercaptopropylmethyl dimethoxysilane, γ-mercaptopropylmethyl diethoxysilane, γ-isocyanatopropyl trimethoxysilane, γ-isocyanatopropyl triethoxysilane, γ-chloropropyl trimethoxysilane, γ-chloropropyl triethoxysilane, γ-ureidopropyl trimethoxysilane, γ-ureidopropyl triethoxysilane and bis (triethoxysilylpropyl)tetrasulfide.

Among the preferred silane coupling agents (D) illustrated above, more preferred are the epoxy- or mercapto-containing silane coupling agents such as γ-glycidoxypropyl trimethoxysilane, γ-glycidoxypropyl triethoxysilane, γ-glycidoxypropylmethyl dimethoxysilane, γ-glycidoxypropylmethyl diethoxysilane, β-(3,4-epoxycyclohexyl)ethyl trimethoxysilane, γ-(3,4-epoxycyclohexyl)propyl trimethoxysilane, γ-mercaptopropyl trimethoxysilane, γ-mercaptopropyl triethoxysilane, γ-mercaptopropylmethyl dimethoxysilane and γ-mercaptopropylmethyl diethoxysilane, and still more preferred are the mercapto-containing silane coupling agents such as γ-mercaptopropyl trimethoxysilane, γ-mercaptopropyl triethoxysilane, γ-mercaptopropylmethyl dimethoxysilane and γ-mercaptopropylmethyl diethoxysilane.

These silane coupling agents (D) may be used alone or in the form of a mixture of any two or more thereof. The amount of the silane coupling agent (D) added is preferably 1 to 30 parts by weight and more preferably 1 to 20 parts by weight based on 100 parts by weight of the thiirane ring-containing compound (A).

In the present invention, the coating composition may further contain, if required, an inorganic filler to obtain a coating film having excellent refractive index and hardness.

Specific examples of the inorganic filler include silica, alumina, calcium oxide, titania, cerium oxide, zirconia, zinc oxide, tin oxide, cadmium oxide, antimony oxide, composite materials of these compounds, and fillers obtained by introducing a polymerizable functional group into these compounds. To ensure a good transparency of the resultant product, these inorganic fillers preferably have a fine particle size, more specifically, a number-average particle size of 50 nm or less.

The inorganic fillers illustrated above may be used alone or in the form of a mixture of any two or more thereof. The amount of the inorganic filler added is 1 to 100 parts by weight and preferably 5 to 50 parts by weight based on 100 parts by weight of the thiirane ring-containing compound (A).

Also, in the case where the inorganic filler is added to the coating composition, in order to enhance the dispersibility, etc., there may be used known solvents or dispersants which are suitably used in ordinary applications.

Upon applying the coating composition, a diluent, etc., may be added thereto, if required, to suitably control a viscosity of the composition. Examples of the diluent include generally used organic solvents such as ethanol, acetone, MEK, ethyl acetate, THF, toluene and methylene chloride. The coating composition may be applied using a coating device such as a hand coater, a bar coater and a spin coater, if required.

The coating composition of the present invention may be applied onto various substrates according to uses and applications thereof. Upon coating, the coating composition of the present invention can generally exhibit a good wetting property to these substrates. Examples of the substrate include plastic substrates made of plastic materials such as polymethyl methacrylate (PMMA), polyethylene terephthalate (PET), polycarbonates (PC), cellulose triacetate (TAC) or alicyclic polyolefins, inorganic substrates made of inorganic material such as glass, quartz and ceramic materials, and metallic substrates made of metals such as aluminum, stainless steel (SUS) and nickel. Meanwhile, the plastic substrates having a poor chemical resistance are preferably protected with an inorganic thin film made of silica, etc.

The photocurable composition and the cured product thereof as well as the coating composition and the coating film produced therefrom according to the present invention, are extremely useful for production of optical products such as optical adhesives, optical coating materials, potting agents for LED, photofunctional films, photofunctional substrates, resist materials, prisms, optical fibers, filters and plastic lenses.

EXAMPLES

The present invention will be described in more detail by reference to the following examples, but it should be noted that these examples are only illustrative and not intended to limit the scope of the present invention thereto.

Example 1

One hundred parts by weight of bis($\beta$-epithiopropyl)sulfide, 2 parts by weight of 1-phenacyl-(1-azonia-4-azabicyclo [2.2.2]-octane)tetraphenyl borate (PnDbBP4), 3 parts by weight of $\gamma$-butyrolactone and 0.1 part by weight of a silicone oil "KF-351" available from Shin-Etsu Chemical Co., Ltd., were intimately mixed with each other to obtain a uniform solution. Then, the thus obtained solution was deaerated under a reduced pressure of 10 Torr for 10 min, and further filtered through a 0.5 μm-mesh PTFE filter. The thus treated solution was applied onto a glass substrate using a bar coater (No. 9) to form a coating film.

The thus coated glass substrate was placed in a box with a quartz window, and a nitrogen gas was flowed through the box. After it was confirmed that an oxygen concentration in the box reached 0.2% or lower, the coating film was irradiated with ultraviolet rays for 4 min using a metal halide lamp (30 mW/cm$^2$; 365 nm). Thereafter, the obtained cured product were examined to evaluate a curing condition and a surface hardness thereof. Meanwhile, the evaluation results of the curing condition of the cured product are classified into the following two ratings:

◯: No tackiness occurred; and x: Tackiness occurred.

The rating (◯: No tackiness) means that the cured product was free from tackiness on the surface thereof and, therefore, was fully cured.

Also, the surface hardness of the cured product was measured using a pencil hardness tester. The results are shown in Table 1.

Examples 2 to 7

The same procedure as in Example 1 was repeated except that the conditions for production of the cured product were changed as shown in Table 1. The results are shown in Table 1.

Example 8

One hundred parts by weight of bis($\beta$-epithiopropyl)sulfide, 2 parts by weight of 1-phenacyl-(1-azonia-4-azabicyclo [2.2.2]-octane)tetraphenyl borate (PnDbBP4), 6 parts by weight of $\gamma$-butyrolactone and 0.1 part by weight of a silicone oil "KF-351" available from Shin-Etsu Chemical Co., Ltd., were intimately mixed with each other to obtain a uniform solution. The thus obtained solution was deaerated under a reduced pressure of 10 Torr for 10 min, and further filtered through a 0.5 μm-mesh PTFE filter. After one droplet of the thus treated solution was dropped onto a glass substrate, the glass substrate was covered with a stretched polypropylene film, and the solution dropped was spread over the glass substrate while discharging air from a space between the film and the substrate.

The coated glass substrate covered with the polypropylene film was irradiated with ultraviolet rays for 2 min using a metal halide lamp (30 mW/cm$^2$; 365 nm). Thereafter, the obtained cured coating film was peeled off from the glass substrate to examine a curing condition and a surface hardness thereof. The results are shown in Table 1.

Comparative Example 1

The same procedure as in Example 8 was repeated except that the irradiation of ultraviolet rays was performed in atmospheric air for 10 min. The results are shown in Table 1.

Comparative Example 2

One hundred parts by weight of bis($\beta$-epithiopropyl)sulfide and 5 parts by weight of a photo-acid generator "PHOTO-INITIATOR 2074 (PI-2074)" available from Rhodia Co., were intimately mixed with each other to obtain a uniform solution. Then, the thus obtained solution was deaerated under a reduced pressure of 10 Torr for 10 min, and further filtered through a 0.5 μm-mesh PTFE filter. After one droplet of the thus treated solution was dropped onto a glass substrate, the glass substrate was covered with a stretched polypropylene film, and the solution dropped was spread over the glass substrate while discharging air from a space between the film and the substrate.

The coated glass substrate covered with the polypropylene film was irradiated with ultraviolet rays for 2 min using a metal halide lamp (30 mW/cm$^2$; 365 nm). Thereafter, the obtained cured coating film was peeled off from the glass substrate to examine a curing condition and a surface hardness thereof. The results are shown in Table 1.

Comparative Examples 3 to 5

The same procedure as in Comparative Example 8 was repeated except that the photo-acid generator "PI-2074" used in Comparative Example 2 was replaced with photo-acid generators "MPI-103" available from Midori Kagaku Co., Ltd., "CI-5102" available from Nippon Soda Co., Ltd., and "CI-2855" available from Nippon Soda Co., Ltd., respectively. The results are shown in Table 1.

Meanwhile, the structures of the respective photo-acid generators are shown below.

"PHOTO-INITIATOR 2074" available from Rhodia Co.:

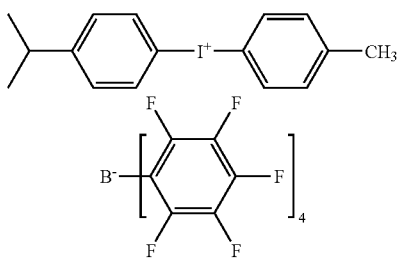

"MPI-103" available from Midori Kagaku Co., Ltd.:

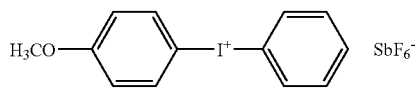

"CI-5102" and "CI-2855" available from Nippon Soda Co., Ltd.:

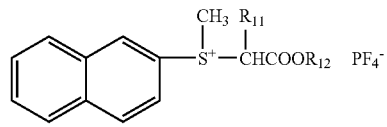

TABLE 1

| | Episulfide (part) | Photo-base generator | Photo-base generator (part) | γ-butyro-lactone (part) | Film thickness (μm) |
|---|---|---|---|---|---|
| Example 1 | 100 | PnDbBP4 | 2 | 3 | 20 |
| Example 2 | 100 | NtDbBP4 | 2 | 6 | 20 |
| Example 3 | 100 | PhPnDbBP4 | 2 | 3 | 20 |
| Example 4 | 100 | PhPnDbBBP3 | 2 | 3 | 20 |
| Example 5 | 100 | PhPnDBUBP4 | 2 | 3 | 20 |
| Example 6 | 100 | PhPnDBNBP4 | 2 | 3 | 20 |
| Example 7 | 100 | PnDbBP4 | 2 | 3 | 30 |
| Example 8 | 100 | PnDbBP4 | 2 | 6 | 30 |
| Comparative Example 1 | 100 | PnDbBP4 | 2 | 6 | 30 |
| Comparative Example 2 | 100 | PI-2074 | 5 | 0 | 30 |
| Comparative Example 3 | 100 | MPI-103 | 5 | 0 | 30 |
| Comparative Example 4 | 100 | CI-5102 | 5 | 0 | 30 |
| Comparative Example 5 | 100 | CI-2855 | 5 | 0 | 30 |

PnDbBP4:

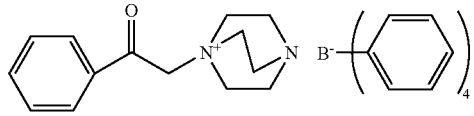

NtDbBP4:

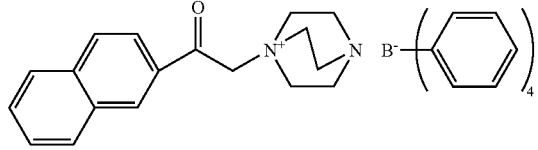

PhPnDbBP4:

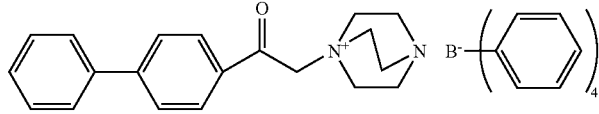

PhPnDbBBP3:

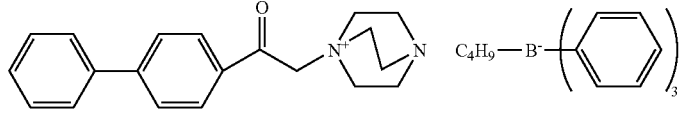

PhPnDBUBP4:

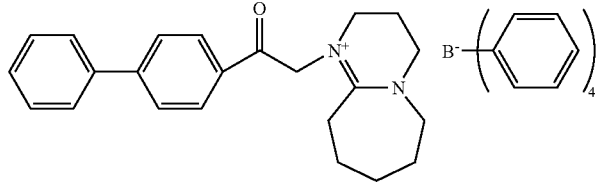

TABLE 1-continued

PhPnDBNBP4:

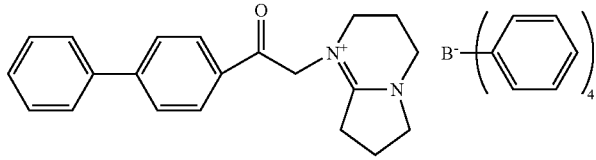

| | Amount of ultraviolet rays irradiated | Ultraviolet-irradiating atmosphere | Curing condition | Surface hardness |
|---|---|---|---|---|
| Example 1 | 30 mW/cm²; 4 min | In N₂ flow | ○ | H |
| Example 2 | 30 mW/cm²; 10 min | In N₂ flow | ○ | H |
| Example 3 | 30 mW/cm²; 2 min | In N₂ flow | ○ | 2H |
| Example 4 | 30 mW/cm²; 2 min | In N₂ flow | ○ | H–2H |
| Example 5 | 30 mW/cm²; 1 min | In N₂ flow | ○ | 2H–3H |
| Example 6 | 30 mW/cm²; 0.5 min | In N₂ flow | ○ | 2H–3H |
| Example 7 | 30 mW/cm²; 4 min | In N₂ flow | ○ | 2H–3H |
| Example 8 | 30 mW/cm²; 2 min | In film | ○ | 2H–3H |
| Comparative Example 1 | 30 mW/cm²; 10 min | In atmospheric air | X | |
| Comparative Example 2 | 30 mW/cm²; 2 min | In film | X | |
| Comparative Example 3 | 30 mW/cm²; 2 min | In film | X | |
| Comparative Example 4 | 30 mW/cm²; 2 min | In film | X | |
| Comparative Example 5 | 30 mW/cm²; 2 min | In film | X | |

Examples 9 to 12

The same procedure as in Example 1 was repeated except that the conditions for production of the cured product were changed as shown in Table 2. The results are shown in Table 2.

Example 13

Ninety five parts by weight of bis(β-epithiopropyl)sulfide, 5 parts by weight of bis(2-mercaptoethyl)sulfide and 0.1 part by weight of 1-(4'-phenyl)phenacyl-(1-azonia-4-azabicyclo[2.2.2]-octane)tetraphenyl borate (PhPnDbBP4) were intimately mixed with each other to obtain a uniform solution. Then, the thus obtained solution was deaerated under a reduced pressure of 10 Torr for 10 min, and further filtered through a 0.5 μm-mesh PTFE filter.

A 1.5 mm-thick O-ring (4D fluororubber) available from Biton Co., was sandwiched between two slide glass plates, and then the slide glass plates were clamped at both ends thereof with clips to form a curing mold. Thereafter, the above obtained solution was poured into the O-ring using a syringe. The mold was irradiated with ultraviolet rays for 5 min in atmospheric air using a metal halide lamp (30 mW/cm²; 365 nm).

As a result, it was confirmed that the solution within the O-ring was fully cured, and the obtained cured product was kept transparent and colorless. On the other hand, the solution leaked out of the O-ring and, therefore, exposed to atmospheric air still remained in a liquid state.

TABLE 2

| | Episulfide (part) | Photo-base generator | Photo-base generator (part) | γ-butyrolactone (part) | Film thickness (μm) |
|---|---|---|---|---|---|
| Example 9 | 100 | 4-MeO-PnDbBP4 | 2 | 6 | 20 |
| Example 10 | 100 | 3-MeO-PnDbBP4 | 2 | 6 | 20 |
| Example 11 | 100 | 4-NO2-PnDbBP4 | 2 | 6 | 20 |
| Example 12 | 100 | 9H-FlDbBP4 | 2 | 6 | 20 |

4-MeO-PnDbBP4:

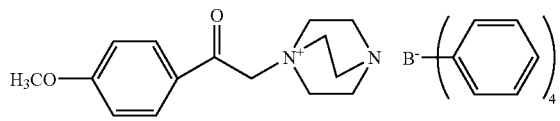

TABLE 2-continued

3-MeO-PnDbBP4:

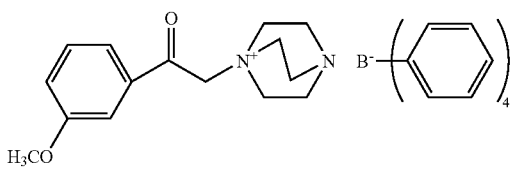

4-NO₂-PnDbBP4:

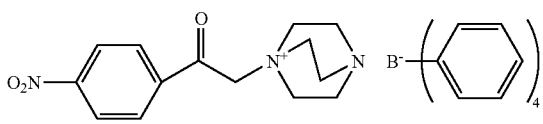

9H-FIDbBP4:

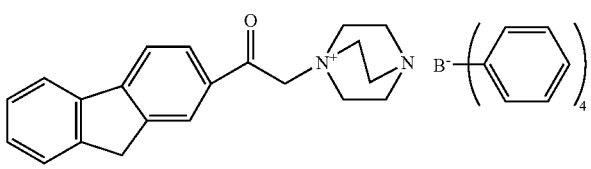

|  | Amount of ultraviolet rays irradiated | Ultraviolet-irradiating atmosphere | Curing condition |
|---|---|---|---|
| Example 9 | 30 mW/cm²; 5 min | In N₂ flow | ◯ |
| Example 10 | 30 mW/cm²; 5 min | In N₂ flow | ◯ |
| Example 11 | 30 mW/cm²; 5 min | In N₂ flow | ◯ |
| Example 12 | 30 mW/cm²; 5 min | In N₂ flow | ◯ |

Example 14

One hundred parts by weight of bis(β-epithiopropyl)sulfide, 1 part by weight of 5-(4'-phenyl)phenacyl-(5-azonia-4-azabicyclo[4.3.0]-5-nonene)tetraphenyl borate (PhPnDB-NBP4) and 0.1 part by weight of a silicone oil "KF-351" available from Shin-Etsu Chemical Co., Ltd., were intimately mixed with each other to obtain a uniform solution. Then, the thus obtained solution was deaerated under a reduced pressure of 10 Torr for 10 min, and further filtered through a 0.5 μm-mesh PTFE filter. The thus treated solution was applied onto a PET (polyethylene terephthalate) substrate using a bar coater (No. 3) to form a coating film having a thickness of about 8 μm.

The thus obtained coated glass substrate was placed in a box with a quartz window, and a nitrogen gas was flowed through the box. After it was confirmed that an oxygen concentration in the box reached 0.2% or lower, the coating film was irradiated with ultraviolet rays for 15 s using a metal halide lamp (30 mW/cm²; 365 nm). The composition was examined for evaluating a wetting property thereof, and the obtained cured product was examined for evaluating a discoloration, a transparency and a uniformity thereof, thereby performing evaluation of properties of the composition as a coating material. The results are shown in Table 3.

Meanwhile, the wetting property, discoloration, transparency and uniformity were evaluated by the following methods, and Rank B or more was regarded as being acceptable.

The wetting property was evaluated according to the following ratings by observing a retention time of the coating film after coating by naked eyes.

A: No cissing occurred for 1 h or longer;
B: Cissing occurred within 1 h; and
C: Cissing occurred within 10 min.

The discoloration was evaluated according to the following ratings by observing a coated substrate placed on a white paper by naked eyes.

A: No discoloration observed;
B: Yellowish discoloration slightly observed; and
C: Yellowish discoloration clearly observed.

The transparency was evaluated according to the following ratings by observing a coated substrate placed on a black paper by naked eyes under a fluorescent lamp in a dark room.

A: Transparent;
B: Slight blooming observed; and
C: Completely opaque.

The uniformity was evaluated according to the following ratings by observing a surface condition of a coating film by naked eyes.

A: Flat coating surface;
B: Substantially flat coating surface; and
C: Irregularities on a coating surface noticed.

Examples 15 to 17 and Comparative Examples 6 to 8

The same procedure as in Example 14 was repeated except that the amount of the added modified silicone oil "KF-351" available from Shin-Etsu Chemical Co., Ltd., was changed as shown in Table 3. The results are shown in Table 3.

TABLE 3

|  | Kind of modified silicone oil | Amount of modified silicone oil added (wt part) | Kind of substrate |
|---|---|---|---|
| Example 14 | KF-351 | 0.1 | PET |
| Example 15 | KF-351 | 0.01 | PET |
| Example 16 | KF-351 | 1.0 | PET |
| Example 17 | KF-351 | 3.0 | PET |

TABLE 3-continued

| | | | |
|---|---|---|---|
| Comparative Example 6 | None | 0 | PET |
| Comparative Example 7 | KF-351 | 0.001 | PET |
| Comparative Example 8 | KF-351 | 5.0 | PET |

| | Wetting property | Evaluation of discoloration | Transparency | Uniformity |
|---|---|---|---|---|
| Example 14 | A | A | A | A |
| Example 15 | B | A | A | A |
| Example 16 | A | A | B | A |
| Example 17 | A | A | B | A |
| Comparative Example 6 | C | A | A | C |
| Comparative Example 7 | C | A | A | B |
| Comparative Example 8 | A | A | C | A |

Examples 18 to 23

The same procedure as in Example 14 was repeated except that the modified silicone oil was replaced with those shown in Table 4, respectively. The results are shown in Table 4. Meanwhile, the modified silicone oils represented by model names having capitals of "KF" and "X-22" are products available from Shin-Etsu Chemical Co., Ltd., and the modified silicone oils represented by model names having capitals of "BYK" are products available from BYK Chemie Japan Co., Ltd.

Examples 24 to 30

The same procedure as in Example 14 was repeated except that the kind and amount of modified silicone oil as well as the kind of substrate were replaced with those shown in Table 5, respectively. Meanwhile, "SUS304" was used as the stainless steel. In addition, "Zeonor" and "ARTON" represent tradenames of alicyclic polyolefin resins available from Nippon Zeon Co., Ltd., and JSR Co., Ltd., respectively, PMMA represents a polymethyl methacrylate resin, and TAC" represents a cellulose triacetate resin.

Example 31

One hundred parts by weight of bis(β-epithiopropyl)sulfide, 1 part by weight of 5-(4'-phenyl)phenacyl-(5-azonia-1-azabicyclo[4.3.0]-5-nonene)tetraphenyl borate (PhPnDB-NBP4), 0.5 part by weight of a silicone oil "BYK-325" available from BYK Chemie Japan Co., Ltd., and 10 parts by weight of y-mercaptopropyl trimethoxysilane "KBM-803" available from Shin-Etsu Chemical Co., Ltd., were intimately mixed with each other to obtain a uniform solution. Then, the thus obtained solution was deaerated under a reduced pressure of 10 Torr for 10 mm, and further filtered through a 0.5 μm-mesh PTFE filter. The thus treated solution was applied onto a glass substrate using a bar coater (No. 3) to form a coating film having a thickness of about 8 μm.

The thus obtained coated glass substrate was placed in a box with a quartz window, and a nitrogen gas was flowed through the box. After it was confirmed that an oxygen concentration in the box reached 0.2% or lower, the coating film was irradiated with ultraviolet rays for 15 s using a metal halide lamp (30 mW/cm$^2$; 365 nm). The composition was examined for evaluating a wetting property thereof, and the obtained cured product was examined for evaluating a discoloration, a transparency and a uniformity thereof, thereby performing evaluation of properties of the composition as a coating material. The results are shown in Table 6.

Meanwhile, the adhesion property was evaluated according to the following ratings by immersing a coated substrate in 80° C. hot water for 3 h, and then observing the coated substrate by naked eyes.

○: No separation of coating film from substrate occurred; and x: Separation of coating film from substrate occurred Examples 32 and Comparative Example 9

The same procedure as in Example 31 was repeated except that the silane coupling agent was replaced with those shown in Table 6, respectively. Meanwhile, "KBM-403 (γ-glycidoxypropyl trimethoxysilane)" is a silane coupling agent available from Shin-Etsu Chemical Co., Ltd.

TABLE 4

| | Kind of modified silicone oil (wt part) | Kind of substrate | Wetting property |
|---|---|---|---|
| Example 18 | KF-352 (0.1) | PET | A |
| Example 19 | BYK-325 (0.1) | PET | A |
| Example 20 | X-22-167B (0.1) | PET | A |
| Example 21 | KF-2001 (0.1) | PET | B |
| Example 22 | KF-105 (0.1) | PET | A |
| Example 23 | X-22-4741 (0.1) | PET | A |

| | Evaluation of discoloration | Transparency | Uniformity |
|---|---|---|---|
| Example 18 | A | A | A |
| Example 19 | A | A | A |
| Example 20 | A | A | A |
| Example 21 | A | A | B |
| Example 22 | A | A | A |
| Example 23 | A | A | A |

TABLE 5

| | Kind of modified silicone oil (wt part) | Kind of substrate | Wetting property |
|---|---|---|---|
| Example 24 | BYK-325 (0.5) | Glass | A |
| Example 25 | BYK-325 (0.5) | Quartz | A |
| Example 26 | BYK-325 (0.5) | Stainless steel | A |
| Example 27 | BYK-325 (0.5) | Zeonor | A |
| Example 28 | KF-351 (0.1) | PMMA | A |
| Example 29 | KF-351 (0.1) | TAC | A |
| Example 30 | KF-351 (0.1) | ARTON | A |

| | Evaluation of discoloration | Transparency | Uniformity |
|---|---|---|---|
| Example 24 | A | B | A |
| Example 25 | A | B | A |
| Example 26 | A | B | A |
| Example 27 | A | B | A |
| Example 28 | A | A | A |
| Example 29 | A | A | A |
| Example 30 | A | A | A |

TABLE 6

| | Kind of modified silicone oil (wt part) | Kind of silane coupling agent (wt part) | Kind of substrate | Wetting property |
|---|---|---|---|---|
| Example 31 | BYK-325 (0.5) | KBM-803 (10) | Glass | A |
| Example 32 | BYK-325 (0.5) | KBM-403 (10) | Glass | A |
| Comparative Example 9 | BYK-325 (0.5) | None | Glass | A |

| | Evaluation of discoloration | Transparency | Uniformity | Adhesion property |
|---|---|---|---|---|
| Example 31 | A | B | A | ○ |
| Example 32 | A | B | A | ○ |
| Comparative Example 9 | A | B | A | X |

The invention claimed is:

1. A coating composition comprising a photocurable composition including (A) an episulfide compound containing a thiirane ring, wherein the compound (A) is represented by the following general formula (4):

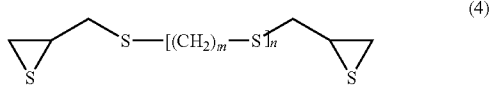
(4)

wherein m is an integer of 0 to 4; and n is an integer of 0 to 2; and (B) a photo-base generator represented by the general formula (1):

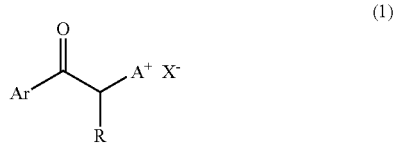
(1)

wherein Ar is phenyl, biphenyl, naphthyl, phenathryl, anthracyl, pyrenyl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, thioxanthyl, phenoxanthinyl, terphenyl, stilbenzyl or fluorenyl which may be unsubstituted, or mono- or poly-substituted with an alkyl group having 1 to 18 carbon atoms, an alkenyl group having 3 to 18 carbon atoms, an alkynyl group having 3 to 18 carbon atoms, a haloalkyl group having 1 to 18 carbon atoms, $NO_2$, OH, ON, $OR^1$, $SR^2$, $C(O)R^3$, $C(O)OR^4$ or halogen wherein R, $R^1$, $R^2$, $R^3$ and $R^4$ are respectively hydrogen or an alkyl group having 1 to 18 carbon atoms; —$A^+$ is an ammonium ion selected from the group consisting of those represented by the structural formulae (2):

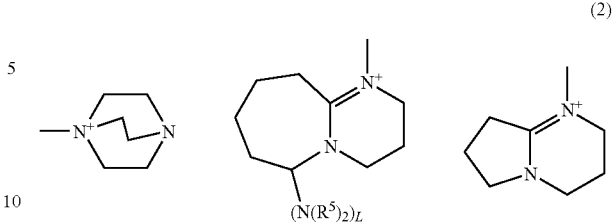
(2)

wherein L is 1 or 0; and $R^5$ is an alkyl group having 1 to 5 carbon atoms; and $X^-$ is a borate anion, an N,N-dimethyldithiocarbamate anion, an N,N-dimethylcarbamate anion, a thiocyanate anion or a cyanate anion; and (C) a modified silicone oil, wherein amount of the modified silicone oil included in the coating composition is 0.005 to 4.0 parts by weight based on 100 parts by weight of the thiirane ring-containing episulfide compound.

2. The coating composition according to claim 1, wherein in the general formula (1), Ar is an unsubstituted phenyl, biphenyl or naphthyl group.

3. The coating composition according to claim 1, wherein in the general formula (1), the counter anion $X^-$ is a borate anion.

4. The coating composition according to claim 1, wherein in the general formula (4), the integer n is 0, or the integer n is 1 and the integer m is 0.

5. The coating composition according to claim 1, further comprising a solvent capable of dissolving the photo-base generator represented by the general formula (1).

6. A method for curing the photocurable composition of the coating composition according to claim 1 by irradiation of ultraviolet rays.

7. A method of curing the photocurable composition of the coating composition according to claim 1 by irradiation of ultraviolet rays in the absence of air.

8. The coating composition according to claim 1, further comprising (D) a silane coupling agent.

9. A method for curing the photocurable composition of the coating composition according to claim 5 by irradiation of ultraviolet rays.

10. A method of curing the photocurable composition of the coating composition according to claim 5 by irradiation of ultraviolet rays in the absence of air.

11. The coating composition according to claim 1, wherein said photo-base generator is capable of generating at least one of 1,4-diazabicyclo[2.2.2]octane, 1,8-diazabicyclo[5.4.0]-7-undecene derivatives and 1,5-diazabicyclo[4.3.0]-5-nonene, upon irradiation of ultraviolet rays.

12. The coating composition according to claim 1, wherein $X^-$ is selected from the group consisting of borate anion, an N,N-dimethylcarbamate anion, a thiocyanate anion and a cyanate anion.

13. The coating composition according to claim 1, wherein the photocurable composition has the property that it is cured by irradiation with light.

14. The coating composition according to claim 13, the photocurable composition having the property that is cured by irradiation with ultraviolet light.

15. The coating composition according to claim 4, wherein in the general formula (4), the integer n is 0.

* * * * *